United States Patent
Sebö

(10) Patent No.: US 10,716,291 B2
(45) Date of Patent: Jul. 21, 2020

(54) ELASTIC DOG HARNESS

(71) Applicants: JULIUS-K9 LLC, Tampa, FL (US); JULIUS-K9 Zrt., Szigetszentmiklós (HU)

(72) Inventor: Gyula Sebö, Szigetszentmiklós (HU)

(73) Assignees: JULIUS-K9 LLC, Tampa, FL (US); JULIUS-K9 ZRT., Szigetszentmiklós (HU)

(*) Notice: Subject to any disclaimer, the term of this patent is extended or adjusted under 35 U.S.C. 154(b) by 291 days.

(21) Appl. No.: 15/954,379

(22) Filed: Apr. 16, 2018

(65) Prior Publication Data
US 2019/0082657 A1 Mar. 21, 2019

(30) Foreign Application Priority Data
Sep. 19, 2017 (HU) .................................... 1700387

(51) Int. Cl.
A01K 27/00 (2006.01)

(52) U.S. Cl.
CPC ................ *A01K 27/002* (2013.01)

(58) Field of Classification Search
CPC .. A01K 27/002; A01K 27/003; A01K 27/005; A01K 1/0263; Y10S 119/907
USPC ................ 119/792, 793, 850, 856, 863, 865
See application file for complete search history.

(56) References Cited

U.S. PATENT DOCUMENTS

| 9,655,344 | B1 * | 5/2017 | Sebo | .................... A01K 27/002 |
| 10,238,091 | B2 * | 3/2019 | Hoffman | ............. A01K 1/0263 |
| 2007/0034164 | A1 | 2/2007 | Sporn | |
| 2007/0044735 | A1 | 3/2007 | Zimmerman | |
| 2010/0263602 | A1 * | 10/2010 | Cho | .................... A01K 27/002 |
| | | | | 119/792 |
| 2012/0160184 | A1 * | 6/2012 | Lichvar | ................ A01K 1/0263 |
| | | | | 119/725 |
| 2013/0327282 | A1 * | 12/2013 | Sebo | .................... A01K 13/006 |
| | | | | 119/850 |

(Continued)

FOREIGN PATENT DOCUMENTS

| DE | 302009060989 | 4/2010 |
| EP | 2910117 A1 | 8/2015 |

(Continued)

OTHER PUBLICATIONS

English Abstract of DE 302009060989.

*Primary Examiner* — Trinh T Nguyen
(74) *Attorney, Agent, or Firm* — Hershkovitz & Associates, PLLC; Abe Hershkovitz

(57) ABSTRACT

An elastic dog harness has a vertical back strap crossing the axis line and a belly strap surrounding the chest of the dog vertically on the side opposite the back strap, a chest strap part holding a moving frame on both sides of the axis line extending between the back strap and the moving frame, surrounding a portion of the moving frame, a chest strap part crossing the chest bone threaded through the moving frame on the side opposite the held portion, the chest strap part crossing the chest bone and the chest strap parts holding the moving frame together form a chest strap surrounding the neck and/or chest of a dog, where the chest strap part holding the moving frame has at least one elastic element on both sides of the axis line, stretching at least partially, the maximum stretching of which is determined by a stretching limiting element.

20 Claims, 7 Drawing Sheets

(56) References Cited

U.S. PATENT DOCUMENTS

| | | | |
|---|---|---|---|
| 2015/0020752 A1* | 1/2015 | Zimmerman | A01K 1/0263 119/792 |
| 2015/0282455 A1* | 10/2015 | Sebo | A01K 27/002 119/863 |
| 2018/0263219 A1* | 9/2018 | Sebo | A01K 27/002 |

FOREIGN PATENT DOCUMENTS

| | | |
|---|---|---|
| HU | U1000003 | 3/2011 |
| HU | U1100245 | 2/2012 |

* cited by examiner

C-C

ELASTIC DOG HARNESS

CROSS-REFERENCE TO RELATED APPLICATIONS

This application is based upon the claims priority under 35 U.S.C. 119 from Hungarian Patent Application No. P1700387 filed on Sep. 19, 2017, the disclosure of which is incorporated herein in its entirely by reference thereto.

FIELD OF THE INVENTION

The present patent relates to dog harnesses, and particularly, an elastic dog harness comprising a back strap, a leash ring located on the axis line fixed on the section of the harness crossing the axis line for attaching a leash, a chest strap surrounding the neck and chest of the dog, threaded through a moving frame on both sides of the axis line, equipped with an elastic element, and a belly strap equipped with a buckle portion. The moving frame is divided, having at least one limiting element opening and a smaller opening for a chest strap part crossing the chest bone, separated by a dividing element. A chest strap part holding a moving frame is threaded through the moving frame, the limiting element opening thereof forming a loose loop in a bulging part in the direction of the chest strap part crossing the chest bone as a stretch limiting element, limiting the extent of stretching of the elastic element holding the moving frame tightly. As a result, the service life of the primarily stretching portion of sized length, extending in the direction of the back strap, located in a channel portion covered by the chest strap part holding a moving frame, is increased.

The elastic element is arranged symmetrically on both sides of the axis line, and is threaded through a loop portion opening separated from the limiting element opening of the moving frame by a held portion, and limited on the other sides by a loop portion frame. The loop portion frame is tightly surrounded by a moving loop portion of the elastic element on the side towards the back strap, and the moving loop portion is separated from the primarily stretching portion of the elastic element by a loop portion fixing. The elastic element has a length and strength designed as a function of the size of the forces expected to act on the chest strap, in order to ensure the long-term usability of the elastic element, and to reduce the adverse effects of the periodic micro-tuggings and sudden pullings acting both on the dog and the person holding the leash while walking the dog on a leash.

BACKGROUND OF THE INVENTION

When the dog is lead on a leash, the steps, the movement of the shoulders of the dog, and the periodic movement of the person holding the leash result in micro-tuggings, which put a load on the joints and can make the healing of injuries difficult. These effects are collectively called HAVS, that is: Hand-Arm Vibration Syndrome. The elastic chest strap is designed to eliminate the adverse effects of the micro-tuggings generated when leading the dog on a leash, while following every move of the dog and the leash.

In the field of technical and structural design, it is essential to quantify, to determine the specifics, the exact values of the different mechanical properties.

The task of the dog harness and the leash is to implement a connection between two bodies of different weights, speeds and speed directions with the lowest possible maximum force. The ratio of the two bodies, the human and the dog, covers a wide range, and therefore, the elastic element of the dog harness is produced in different sizes, with different mechanical properties. In the case of a constantly tight leash, a "static" pulling force acts, which is favourable in terms of peak force.

During the movement of the human and the dog, as a result of the steps and the swinging of the arm, a continuous periodic-dynamic excitation occurs, the load causes a so-called tugging force which can have an adverse effect on the joints, depending on its strength. The elastic dog harness of the present invention is specifically directed to dampening this effect.

In the case of a loose leash, tugging occurs at the moment of the straightening of the leash as a result of a jump in speed. In theory, in the case of a perfectly rigid structure, the "force acting" upon tugging "as a result of infinitely high acceleration" is "infinitely high." In reality, however, due to the elasticity of the connection points of the leash and the harness, the duration of tugging increases, which can be significant in spite of a reduction in the peak force, depending on the speed and weight conditions, and the elasticity of the connection. In addition, the tugging force acts unexpectedly, shockingly, catching both the human and the dog unprepared. The high force and shock resulting from tugging can be reduced by incorporating elastic elements of the planned design into the dog harness. Tugging occurs when there is a big difference between the acceleration of the two bodies. The design of elastic elements has to take into consideration the load, stress acting on the material, and on the participants. Both humans and dogs need time for their muscles to adapt to the load changes safely.

Diseases associated with vibration-tugging load on the human hand and arm, such as the Raynaud's Syndrome, the Carpal Tunnel Syndrome, and diseases involving the inflammation of the tendons, have provided a basis for examining how similar loads act on the body of the dog and the human holding the leash while leading the dog on a leash, and how these loads could be reduced by a dog harness equipped with an elastic chest strap of sized stretching. Research and development can result in unexpected effects in terms of the location, length and fixing of the elastic elements. In the prior art, there has been no research into the forces acting during the street use of dog harnesses, and into the reduction of the peak forces.

The micro-tuggings can be dampened by elastic elements incorporated into the dog harnesses. The importance of pulling or driving horse harnesses known in the prior art has been superseded by the development of technology and motorization, but through the centuries, there was no demand for an elastic design for pulling harnesses. In the case of pulling chest harnesses, it was not desirable to reduce the forces acting on the shoulder joints. In contrast, the market of harnesses developed for dogs is expanding, as it is the ideal solution for leading a dog on a leash.

The dog harnesses found in the prior art are made of leather and/or textile straps, padded on the back part, chest part and belly part of the dog in a fixed, or sometimes in a releasable manner. The purpose of padding is to distribute the pressure over the surface of the body, to stabilize the straps, and to allow the attachment, display of additional equipment (e.g. bags, GPS, light or camera devices) and/or graphic elements, high visibility colours, labels on the padding itself, or on the cover thereof. The straps covering the belly part and the chest bone part (the chest strap and the belly strap) are subjected to increased stress when the dog is lead on a leash, or during training and police work. On dog chest harnesses according to the prior art, these straps are fixed together, they are form-stable, capable of minimal stretching in practice. The straps of the harnesses are made by band weaving, by interlacing warp yarns and weft yarns made from synthetic filaments, such as polyester (PES), polypropylene (PP), and polyamide (PA) fibers. The stretching of these high-tensile strength straps (Ultimate Tensile Force F=700N) on the dog harness under load is practically negligible. Their stretchability, that is, elasticity, is far below that of rubber, silicone or elastomer materials.

It is commonly known that especially the bones of developing young dogs and old dogs need to be spared from strong mechanical impacts. This includes even the load resulting from the daily walk on a leash. The padding of the chest strap and/or the belly strap is only a partial solution for reducing the micro-tugging forces.

Another load, a sudden great tugging force, occurs upon an unexpected jump in speed, at the moment of the straightening of the leash. Such a shock-like load is not sufficiently reduced by the padding materials, or padded straps.

The adverse effects of the load acting when leading the dog on a leash can be reduced in the area of the chest strap.

The chest straps of dog harnesses preferably consist of at least two parts, but there are also undivided, non-adjustable chest straps made of one strap connecting the two sides of the harness and also the two ends of the back strap, in the continuation thereof.

The most common chest strap design for dog harnesses is a Hungarian development from 1997, which is a chest strap running horizontally at the height of the chest bone of the dog, divided into two main parts, adjustable by a hook-and-loop fastener by threading it through a fastener/slide adjuster. It is special in that it uses the hook-and-loop fastener closure used for shoes as well, threaded through a loop adjuster and closing on itself from the opposite side, closing in the direction of the load. Thus, under load, the chest of the dog presses the hook-and-loop fastener components together, and they are prevented from opening by the conditions of use themselves. This dog harness was introduced into regular use, first for Austrian, then for German service dog units, under the name "K9-Powerharness" (DE302009060989). As the name of the device already suggests, it was designed for high stresses occurring especially in the case of service and sports dogs.

The chest strap, attached to the connection point of the back strap and/or the belly strap, in the continuation thereof, on one side of the dog harness, ends in a cut edge, while on the other side, it preferably ends in an oval fastener/slide adjuster, or frame. The chest strap gets in a state ready for use by threading through this fastener/slide adjuster and closing on itself. Thus, in this case, the chest strap is divided into two parts: there is one section on one side of the dog harness, extending from an oval ring-shaped fastener/slide adjuster to the connection point of the belly strap and/or back strap, the so-called chest strap part holding a fastener/slide adjuster, while there is another section on the other side of the dog harness, closing on itself, threaded through the fastener/slide adjuster during use, the so-called adjustable-length chest strap part, or chest strap part crossing the chest bone. This chest strap section extends from the cut edge of the adjustable-length chest strap part, equipped with a hook-and-loop fastener, to the connection point of the adjustable-length chest strap part and the back strap and/or the belly strap. In the prior art, pressure distributors for chest straps, generally made of an elastic material, are attached to the hook-and-loop fastener of the latter, the adjustable-length chest strap part of the chest strap closing on itself, and/or to the chest strap itself.

Utility model file No. U1000003 discloses a pressure distributor incorporating a chest pad made of an elastic material that is not only threaded onto the chest strap of a chest harness, but is also attached to the hook-and-loop fastener thereof. The chest pad makes it much easier for the dog to tolerate lifting, for example by the handle fixed on the harness. In the event of a sudden load in the direction of movement, the chest of the dog is supported by the whole width of the surface of the chest pad, but its stretching is practically minimal, so its load absorbing capacity is low. The chest strap of the dog harness is not of elastic design.

Utility model file No. U1100245, disclosing a so called "I" connecting element of partially elastic design, also describes the padding of the chest strap of the dog harness. This pressure distribution device is mounted on the chest strap in a releasable manner, perpendicularly to it, and it connects the chest strap and the belly strap of the harness, and at the same time, it can be connected to the collar as well. The significance of the device is that, by fixing three points together, the use of the harness becomes safer, for example for service/assault dogs, as it prevents the chest strap of the dog harness from sliding down towards the forelegs of the dog during vigorous movement. However, this pressure distribution device has the disadvantage that it affects only to a minimum extent the distribution of the load on the chest part and the shoulder joints. The device is not suitable for dampening the micro-tuggings generated when leading the dog on a leash. Nevertheless, the significance of the device is indisputable, as the "I" connecting element was the first pressure distribution element including an elastic portion that was mountable on the chest strap of dog chest harnesses in a releasable manner. While the device is attached to the chest strap of the dog harness by means of straps incapable of elastic stretching, at the opposite end, it is connected to the collar by means of a rubber ring of elastic design. However, the limitation of stretching is not implemented in that development. The elastic portion of the pressure distribution device is in direct contact with the body of the dog, and can put an undesirable load on the fur of the dog, if the instructions for use are not followed exactly by the user.

The development and spread of pressure distribution devices mountable on dog chest harnesses among hobby dog owners clearly proves that there is a demand for dampening the forces acting when leading the dog on a leash.

Patent No. US20070034164 A1 discloses an elastic design for dog harnesses. On the chest part of an elastic harness to be used for dogs, an elastic insert is included between the load-bearing, non-elastic straps. The biggest disadvantage of the development is that the elastic elements are not covered, and their stretching is not limited. Therefore, while the elastic portion can be made durable, its fatigue can be avoided only by using an oversized, excessively wide/thick elastic portion in direct contact with the body of the dog. No calculation or design for, or reference to, sizing is included in the patent.

The dog harness of Zimmerman (US 20070044735 A1) has been developed for special use. This development, however, refers only in general to the use of elastic straps, for added comfort. Generally, they allow a form fitting, comfortable design.

The developments listed above are not suitable for the long-term, elastic compensation of the forces acting when leading the dog on a leash. The above solutions are intended for other, specific purposes. The elastic elements are included not as a function of the forces acting between the chest strap and the leash ring, and not for the purpose of dampening them.

All prior art developments also have the disadvantage that the elastic elements are not covered or wrapped. Thereby, the elastic elements are directly exposed to environmental effects, and primarily the harmful UV rays of the sun. Furthermore, in the event of repeated tuggings, the elastic portions are not relieved by a limiting element. The elastic elements are also load-bearing elements, whereby they wear out more frequently. Elastic design is incorporated into the devices as a function arising obviously from elasticity. Therefore, the permanent, deforming stretching of the elastic portion is inevitable, and its breaking can only be avoided by using it only in the lower range of elastic stretching.

The long-term safe use of the stretching elements is of primary importance, and it is possible only if the stretching of the elastic structural elements is limited by a separate structural element.

Another development is Chest harness with an elastic chest strap filed under application No. EP20150000491. In this development, the stretching of the elastic portion is limited by an element limiting the stretching of the elastic portion. The element limiting the stretching of the elastic portion is a bulging part of the chest strap part holding a fastener/adjuster ring, or the chest strap part holding a frame. The limitation of stretching increases the service life of the elastic portion.

A disadvantage of this development is that the elastic portion is looped around the fastener/adjuster ring or frame loosely, and it is not tightened on the ring or frame to prevent it from turning out. The fastener/adjuster ring is only an elongated, oval element, the interior of which is not divided into separate through openings for the chest strap part crossing the chest bone and the chest strap part holding a fastener/adjuster ring. Furthermore, its interior lacks angular connections as it is curved, which has the disadvantage of making it possible for the straps threaded through it to get wrinkled.

The fastener/adjuster ring can turn out as a result of the loads, and this cannot be prevented by the element limiting the stretching of the elastic portion, forming a loose loop, as it is not holding the fastener/adjuster ring tightly. This can lead to the fastener/adjuster ring or frame holding the chest strap turning with its narrower side into the horizontal direction under load and wrinkling the chest strap as a result of prolonged or intensive use. The chest strap can slide down to the legs of the dog even during normal use, as the size of the fastener/adjuster ring allows this. The element limiting the stretching of the elastic portion is a loose loop, which is disadvantageous because it allows the displacement or turning out of the ring. The design of the element limiting the stretching of the elastic portion contains no details or calculations about the size of the forces acting between the leash ring and the chest strap, and the length of the stretch limiting element. Therefore, its design according to this prior art development is haphazard.

A further disadvantage is that the sewing used in this development fixes both the elastic portion and the element limiting the stretching of the elastic portion, which makes it impossible to design the length of the elastic portion, or at least to increase its length to any substantial extent.

The sewing connecting together the elastic portion and the element limiting the stretching thereof is directly beside the fastener/adjuster ring. The stretching of the elastic portion is possible only over the section surrounding the fastener/adjuster ring or frame, up to the sewing running beside the fastener/adjuster ring. Thereby, the load generated when leading the dog on a leash places increased stress on the structure of the elastic portion fixing the fastener/adjuster ring as well. The chest harness with an elastic chest strap does not provide a solution for a significant extension of the stretching part of the elastic portion. A serious disadvantage is that the elastic portion is connected to the chest strap part holding a fastener/adjuster ring adjacent to the fastener/adjuster ring. It is not possible to have a primarily stretching elastic portion stretching over a long section, and a channel portion for protecting it. The stretching of the elastic portion loosely surrounding the fastener/adjuster ring is strictly limited to the length determined by the sewing, which is too short a section to significantly reduce the peak forces. The fastener/adjuster ring, through which the elastic portion is threaded, due to its design, is incapable of holding the elastic portion vertically.

Therefore, the short elastic portion threaded through the fastener/adjuster ring, moving in the fastener/adjuster ring, receives load from friction as well, which does not allow prolonged use, foreshadowing the premature wearing out of the elastic portion.

The prior art development discussed above does not provide for a narrower elastic portion compared to the element limiting the stretching of the elastic portion. The elastic portion disclosed in the prior art development, having the same width as the element limiting the stretching of the elastic portion, is at least partially exposed to the harmful UV-rays of the sun, causing the premature aging of the rubber or other elastic material. Furthermore, the elastic portion of the prior art development can come into direct contact with landmarks during use, which can damage the surface of the elastic portion. A narrower design of the elastic portion than the limiting element would allow the implementation of a channel in which the length of the elastic portion could be increased. This, however, is not disclosed in the prior art. Furthermore, in the above prior art development, the design of the elastic portion and the element limiting the stretching of the elastic portion is not the same on the two sides of the chest strap, that is, on the two sides of the axis line, allowing different and predictable permanent elongation and wearing out on the two sides of the chest strap.

In the case of elastic dog harnesses found in the prior art, the components of the chest strap are not threaded through fastener/adjuster rings or frames including function-specific through openings of significantly different sizes for the individual parts of the chest strap. Therefore, the individual components of the chest strap can disadvantageously get displaced, wrinkled, and can slide down to the front legs of the dog, leading to injury or the dog getting loose. In the prior art, the use of elastic elements in dog harnesses lacks any calculation-based design with respect to wearing out, overloading, or elastic elements of widths and strengths varying as a function of the size of the dog harness.

In general, it can be stated that the prior art does not teach or suggest a dog harness in which the elastic design, the movement of the dog harness as a whole, or elements thereof, does not have an undesirable physical effect perceptible to the dog when led on a leash.

SUMMARY OF THE INVENTION

The present invention recognizes that elastic elements incorporated into dog harnesses come into contact with the body of the dog at least partially, or are designed to surround the body of the dog, or to move on the body of the dog, whereby the movement of the dog harness as a whole can irritate the dog.

In the present invention, elastic elements are incorporated in a manner protected from physical impacts, and they are not covered.

The elastic element of the present dog harness is in fact a woven strap, the elasticity of which is provided by weaving elastic elastomer/silicone etc. warp yarns into it.

The spring stiffness of the elastic element depends on the elastic properties and number of elastic yarns woven into it, and on the length of the elastic element incorporated into the dog harness. If a longer elastic element is incorporated into the dog harness, the spring is softer, and for a given stretching, the increase in force at the end of the freely stretching section is lower.

The task is to test the fatigue of the elastic element resulting from repeated stress. During the fatigue test, the elastic element of the harness is subjected to cyclic stress. The amplitude of the load will be greater than the elastic stretching section, and thus, the durability of the sewing fixing the ends of the elastic section can also be tested. The aim is to achieve a high number of fatigue cycles.

This can be implemented by analyzing the forces acting on the dog harness while leading the dog on a leash. This allows the determination of the length of the elastic to provide dimensionally stable deformation to be implemented to offset the micro-tuggings, and the size of the moving frame and the size of the stretch limiting element.

The aim of the elastic dog harness of the present invention, is to eliminate the above disadvantages, and, in addition to providing maximum comfort for the dog, to reduce the load resulting from tuggings and pullings that also can have an adverse effect on the health of the human holding the leash.

The aim of this claimed invention is to provide a symmetrical design for a moving frame on both sides of the axis line, thereby providing the adjustability of the length of the chest strap part crossing the chest bone on both sides. Another aim is to provide a moving frame with multiple through openings, and to thread the chest strap part crossing the chest bone and the chest strap holding a moving frame through sized through openings separated from each other. The aim is, furthermore, to develop a channel portion closed at one end, in which the primarily stretching portion of the elastic element is sized according to the forces, and moves as a result of the forces.

The aim also is to develop a channel portion for the elastic element on both sides of the axis line, open and/or openable towards the chest strap part crossing the chest bone, covered by the chest strap part holding a moving frame. All this should be implemented in such a way that the elastic element incorporated into the elastic chest strap should be suitable for holding the moving frame tightly, by sewing the moving loop portion tightly.

A loop portion fixing should hold the moving frame tightly, and the loop portion fixing should move together with the primarily stretching portion and the moving frame in the channel portion. The aim is to close the channel portion with a fixing zone, while the opposite end thereof should be covered by the moving frame in an openable manner. The aim is to develop the channel portion in a manner extending beyond the back strap fixing zone, to ensure the length and softness of the primarily stretching portion.

Moreover, the aim is to ensure that the maximum stretching allowed by the stretch limiting element is a maximum of 25-35% of the total elastic stretching of the elastic element, as measured by tensile testing. The aim is to ensure that due to oversizing, no permanent deformation is caused in the elastic element by repeated stretching up to 500,000 times.

Accordingly, the aim of the present invention is to prevent the elastic element from suffering a load causing permanent deformation when leading the dog on a leash. For this, however, it is not enough to incorporate a stretch limiting element into the structure, but the total length of the elastic element should also be increased, while seeking to ensure that the held portion of the moving frame is held tightly by the moving loop portion. The aim is to analyze and size the force-stretching of the chest strap of the individual dog harness sizes, to determine the length of the channel portion, and the primarily stretching portion moving in it. The aim also is to assess the force of the micro-tuggings generated in the case of dogs of different weights, and to develop a channel portion accordingly, making it possible to increase the length of the elastic element. The aim further is to allow the elastic element to stretch to maximum 30%, and to limit stretching beyond that by a stretch limiting element, in order to ensure prolonged use. Within this, the distance between the starting points and the fixing of the elastic element should be developed properly, by determining the desirable extent of stretching and the extent of stretching not overloading the elastic element, to allow its prolonged use for dampening the micro-tuggings generated when leading the dog on a leash. Therefore, it is also important to determine the material and the physical properties of the elastic element.

As well, the aim is to incorporate a channel portion of an adequate size between the chest strap part holding a moving frame and an underlay formed from a foldback in the continuation of the chest strap on the surface of the elastic element, which is not more abrasive than average, in such a way that the elastic element is not restrained by the surface of the chest strap in its periodic movement in the direction of the chest strap crossing the chest bone. The channel portion should be wider than the width of the elastic element, and the channel portion should be defined by the starting points, a fixing zone towards the leash ring, and a fixing zone towards the belly strap. It is important to separate the elastic element completely from the body of the dog, to protect the fur of the dog from friction.

The aim also is to incorporate a stiffener that is at least partially wider than the underlay, in order to ensure that the elastic dog harness is not wrinkled by the elastic operation.

The aim is further to optimize the location of the starting points fixing together the chest strap part holding a moving frame and the underlay, in order to ensure that in the rest state of the elastic element the moving frame, the held portion thereof is confined into the moving loop portion by the starting points, preventing its disadvantageous displacement as a result of the weight of the chest strap part crossing the chest bone. For this purpose, the pre-tensioning of the primarily stretching portion and the technical solutions thereof should also be considered, especially in view of the fact that the side of the primarily stretching portion towards the axis line, along the whole length thereof, is subjected to higher load by the weight of the chest strap. The aim is to determine whether changing the length of the primarily stretching portion through the cross-section of the elastic element, in the same channel portion, by developing an elastic element fixing zone at an angle for the elastic element, would result in a higher tension on the side of the elastic element towards the axis line, or not. The development of an elastic element fixing zone at an angle, thus influencing its strength in the channel portion, can be advantageous in order to hold the weight of the chest strap. It can be implemented in a way ensuring that the weight of the chest strap part crossing the chest bone does not stretch or load the side of the primarily stretching portion towards the axis line more than the other sections of the elastic element.

The present invention relates to an elastic dog harness comprising at least one vertical back strap crossing the axis line, at least one leash ring located on the axis line and fixed thereon in a manner touching the axis line, and at least one belly strap surrounding the chest of the dog vertically on the side opposite to the back strap. Furthermore, a chest strap part holding a moving frame on both sides of the axis line, lined with an underlay, extends between at least the back strap and a moving frame, surrounding a held portion of the moving frame. A chest strap part crossing the chest bone, threaded through the moving frame on the side opposite to the held portion and interrupting the continuity of the chest strap, is folded back on itself in the direction opposite to the chest strap part holding a moving frame. The chest strap part crossing the chest bone and the chest strap parts holding the moving frame together form a chest strap surrounding the neck and/or chest of the dog. Furthermore, the chest strap part holding a moving frame of the elastic dog harness has at least one elastic element on both sides of the axis line, stretching at least partially, the maximum stretching of which is determined by a stretch limiting element which is an extension of the chest strap part holding a moving frame, threaded through the moving frame as a loose loop extending beyond the held portion thereof, forming a loop traversable from the direction of the back strap and a connecting element. The elastic element is at least partially covered by the stretch limiting element from the direction of the chest strap part crossing the chest bone, loosely surrounding the elastic element, which elastic element is threaded through the moving frame.

The essence of the claimed invention is that the elastic dog harness comprises a chest strap part holding a moving frame on both sides of the axis line, comprising at least one channel covering chest strap portion at least partially covering an elastic element, extending beyond the elastic element in the direction of both the back strap and the belly strap as well as starting points, and a stretch limiting element having a channel portion open towards the chest strap part crossing the chest bone, covered by the held portion of the moving frame in a releasable manner, extending from the starting points in the direction of the back strap, of a length between the starting points and an elastic element fixing zone, enclosed by the channel covering chest strap portion and the underlay. The maximum width of the channel portion is limited by a fixing zone towards the leash ring and a fixing zone towards the belly strap, running between the back strap and the starting points, fixing together the channel covering chest strap portion and the underlay. The primarily stretching portion of the elastic element moves in the channel portion in the direction of the chest strap part crossing the chest bone and in the opposite direction up to a length determined by the stretch limiting element. Furthermore, the primarily stretching portion of the elastic element is at least partially separated from a moving loop portion by a loop portion fixing moving together with it in the channel portion. The stretch limiting element is threaded through the moving frame through a limiting element opening, while the chest strap part crossing the chest bone is threaded through an opening for the chest strap part crossing the chest bone, separated from the limiting element opening by a dividing element.

In a preferred embodiment, the moving loop portion is threaded through a loop portion opening at least partially separated from the limiting element opening by the held portion.

Preferably, a loop portion frame is connected to the held portion in the continuation thereof.

Preferably, the loop portion frame extends into the channel portion, and is enclosed on two sides by the starting points.

The length of the loop portion frame measured in the direction of the back strap is equal to or longer than the length of the limiting element opening measured in the same direction.

The loop portion frame is enclosed tightly by the starting points on the side of the fixing zone towards the leash ring and on the side of the fixing zone towards the belly strap.

The length of the primarily stretching portion measured between the loop portion fixing and the elastic element fixing zone is equal to or longer than the width of the primarily stretching portion measured in the direction of the loop portion fixing.

The moving loop portion is formed from the primarily stretching portion, an elastic strap, in the continuation thereof.

The loop portion fixing fixes the moving loop portion tightly on the moving frame.

The starting points are preferably sewings or rivet reinforcements, enclosing the loop portion frame of the moving frame on the side of the fixing zone towards the leash ring and on the side of the fixing zone towards the belly strap.

The width of the primarily stretching portion measured in the direction of the loop portion fixing is a maximum of 90% of the width of the chest strap part holding a moving frame in the same direction.

The distance of the fixing zone towards the leash ring and the fixing zone towards the belly strap from each other is at least 10% longer than the width of the primarily stretching portion measured in the same direction.

At least one cut edge of the elastic element is led under the back strap.

The elastic element fixing zone is sewing.

In a preferred embodiment of the elastic element fixing zone, the primarily stretching portion is shorter on the side of the fixing zone towards the leash ring than on the side of the fixing zone towards the belly strap.

The moving loop portion is fixed by the loop portion fixing with pre-tensioning.

The primarily stretching portion reaches the maximum stretching controlled by the stretch limiting element at a load of 10-25 N (Newton).

The maximum stretching of the primarily stretching portion allowed by the stretch limiting element is 30%.

BRIEF DESCRIPTION OF THE DRAWINGS

The elastic dog harness according to the claimed invention is shown in the following figures:

DETAILED DESCRIPTION OF THE INVENTION

Figure 1:
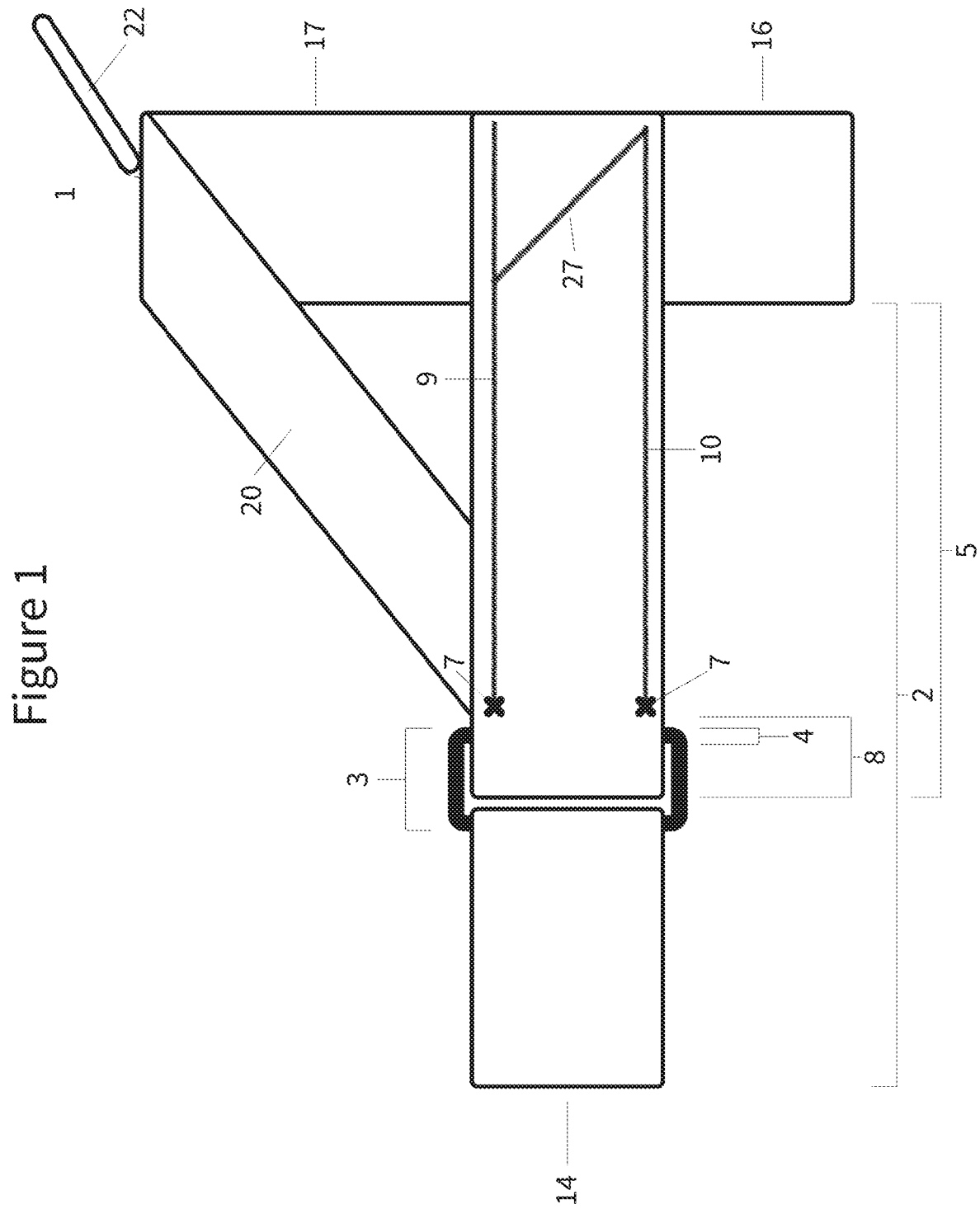
FIG. 1 shows a side view of the elastic dog harness made of straps, with the chest strap part crossing the chest bone threaded through the moving frame in a state ready for use, and the elastic element fixing zone touching the back strap.

FIG. 1 shows the elastic dog harness 1 made of straps, comprising a connecting element 20, a chest strap 2, a belly strap 16, and a back strap 17. The chest strap 2 is divided by moving frames 3 into chest strap parts holding a moving frame 5 and a chest strap part crossing the chest bone 14. The chest strap parts holding a moving frame 5 comprise a stretch limiting element 8 extending from starting points 7 located at both ends of a held portion 4 of the moving frame 3 in the direction of the chest strap part crossing the chest bone 14. On the chest strap parts holding a moving frame 5, a fixing zone towards the leash ring 9 and a fixing zone towards the belly strap 10 are formed from the starting points 7 in the direction of the back strap 17, in parallel to each other, touching the back strap 17 and ending in an elastic element fixing zone 27. The starting point 7 can be a given point of the fixing zone towards the belly strap 10 or the fixing zone towards the leash ring 9 that is the point located closest to the moving frame 3. The elastic element fixing zone 27 is located closer to the starting point 7 on the side of the fixing zone towards the leash ring 9 than on the side of the fixing zone towards the belly strap 10, increasing the tension of the primarily stretching portion 26 over that section, in order to ensure that it is not stretched unevenly due to the own weight of the chest strap part crossing the chest bone 14. The starting point 7 is rivet or zig-zag sewing, fixing together the connecting element 20 and the chest strap parts holding a moving frame 5. The moving frame 3 is preferably rounded, made of metal or plastic with high load bearing capacity. Furthermore, within the moving frame 3, the chest strap part crossing the chest bone 14 is separated from the chest strap parts holding a moving frame 5 by a dividing element 3b. There is a leash ring located on the axis line 22 on the side of the back strap 17 opposite to the belly strap 16.

Figure 2:
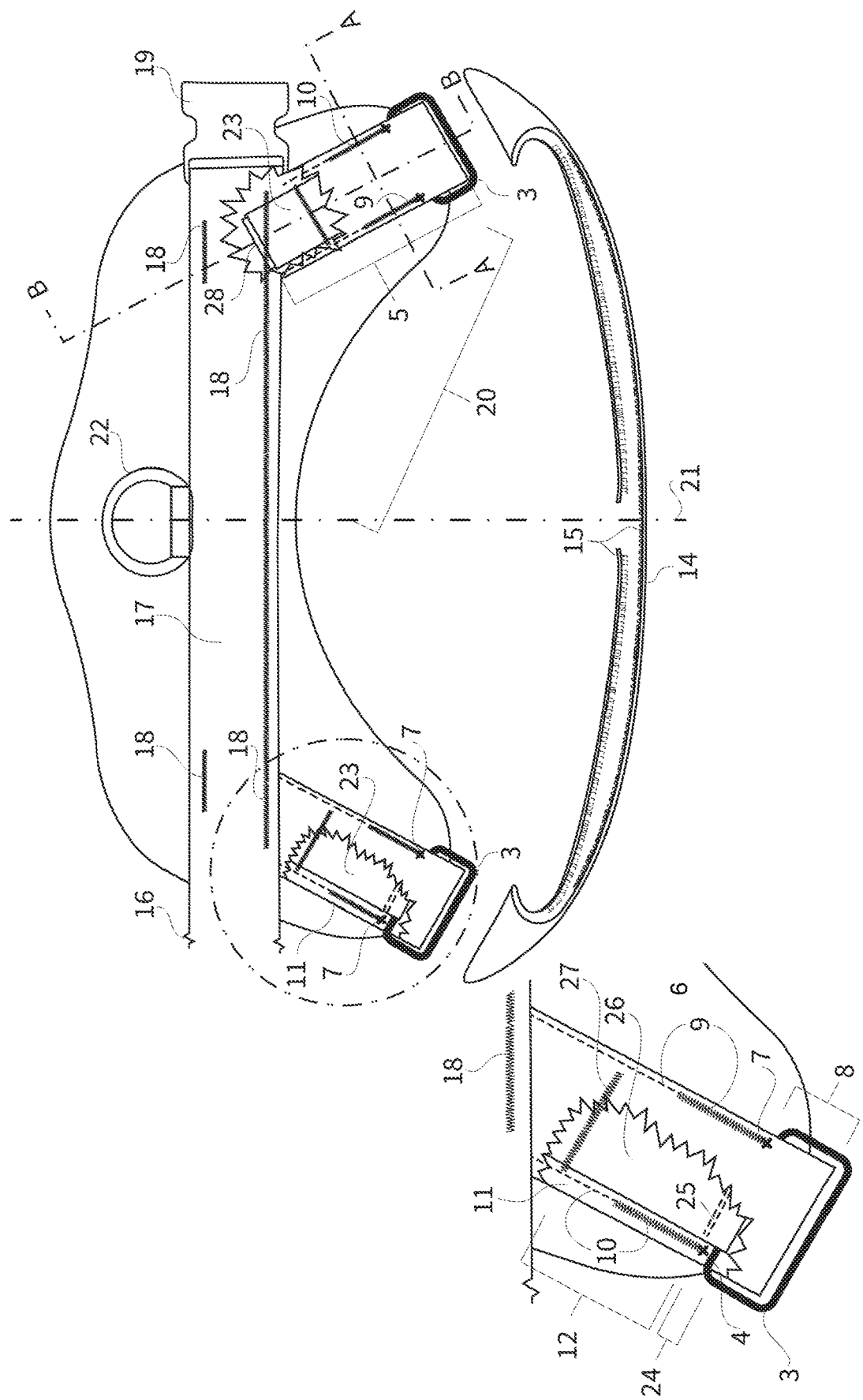
FIG. 2 shows a top view of the elastic dog harness in an outspread position, with an exploded chest strap part crossing the chest bone, and local cross sections of the channel portion and the structural elements located directly under the channel covering chest strap portion, as well as a detail drawing showing the main parts of the elastic element and the channel portion.

The elastic dog harness 1 shown in FIG. 2 comprises a leash ring located on the axis line 22 and touching the back strap 17. Back strap 17 ends on one side in a buckle portion 19, and the other end extends to a belly strap 16, fixed on connecting element 20 of the elastic dog harness 1 preferably by a continuous line back strap fixing zone 18. The elastic dog harness 1 has a chest strap 2 comprising a chest strap part crossing the chest bone 14, chest strap parts 5 holding moving frames 3 separating the two from each other, as its main parts. The chest strap part crossing the chest bone 14 is shown exploded from the moving frame 3 on both sides of the elastic dog harness 1 on the two sides of the axis line 21, in an out of use state, closed on itself by means of a chest strap hook and loop fastener 15. The connecting element 20 extends from the moving frame 3 in the direction of the axis line 21, it is preferably a strap and/or a given section of a stiffener 13. The chest strap part holding a moving frame 5 has an underlay 11 folded back on itself in the direction of the back strap 17. Furthermore, a channel covering chest strap portion 6 of the chest strap part holding a moving frame 5 is fixed on the stiffener 13 by the fixing zone towards the belly strap 10 and the fixing zone towards the leash ring 9. The fixing zone towards the leash ring 9 and the fixing zone towards the belly strap 10 are formed on the chest strap part holding a moving frame 5, running parallel to each other, allowing the free movement of the primarily stretching portion 26 of an elastic element 23 in the direction of the chest strap part crossing the chest bone 14. The elastic element fixing zone 27 is connected to the fixing zone towards the belly strap 10 and crosses the fixing zone towards the leash ring 9, and its end on the side of the fixing zone towards the leash ring 9 is closer to a loop portion fixing 25 than its end on the side of the fixing zone towards the belly strap 10. The width of the underlay 11, the stretch limiting element 8 and the channel covering chest strap portion 6, measured in the same direction as the held portion 4, is the same, and they are preferably formed in the continuation of one another.

The channel covering chest strap portion 6 extends between the starting points 7 and the back strap 17, ending in the back strap 17. The elastic element fixing zone 27 fixes together the channel covering chest strap portion 6 with the primarily stretching portion 26 and the underlay 11. In a preferred embodiment, the elastic element fixing zone 27 is a given section of the back strap fixing zone 18, or is formed in a manner touching the back strap 17. A moving loop portion 24 tightly surrounds the held portion 4, and is separated from the primarily stretching portion 26 by the loop portion fixing 25. The loop portion fixing 25 is parallel to the held portion 4, formed by sewing running close thereto. The starting points 7 are formed in a manner not touching the loop portion fixing 25, but they are closely adjacent thereto.

The elastic element 23 ends under the back strap 17 in a cut edge 28, as shown in a local cross section in FIG. 2. The length of the primarily stretching portion 26 in the direction of the back strap 17 is longer or equal to the width of the moving loop portion 24 measured in the direction of the loop portion fixing 25. In the case of dogs weighing 20-40 kg, the width of the primarily stretching portion 26 is most preferably 25 mm, and its length is minimum 50 mm. The moving loop portion 24 is shown in a local cross section in FIG. 2, under the stretch limiting element 8.

Figure 3:
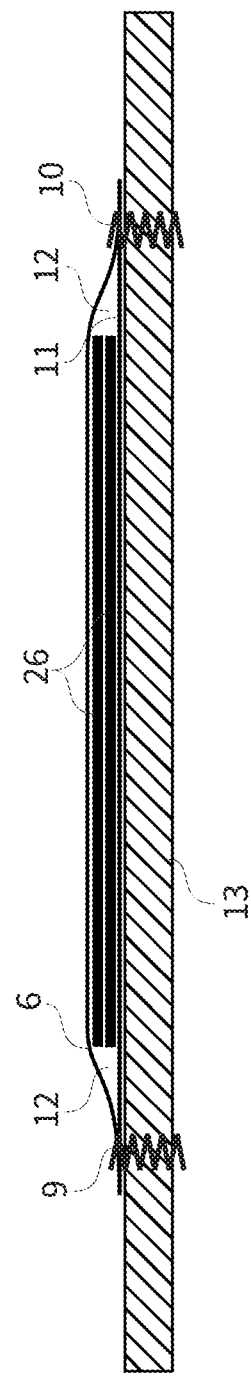
FIG. 3 shows the A-A cross-section of the channel portion of the elastic dog harness of FIG. 2, the underlay, the channel covering chest strap portion, and the primarily stretching portion located between the fixing zone towards the leash ring and the fixing zone towards the belly strap.
Figure 4:
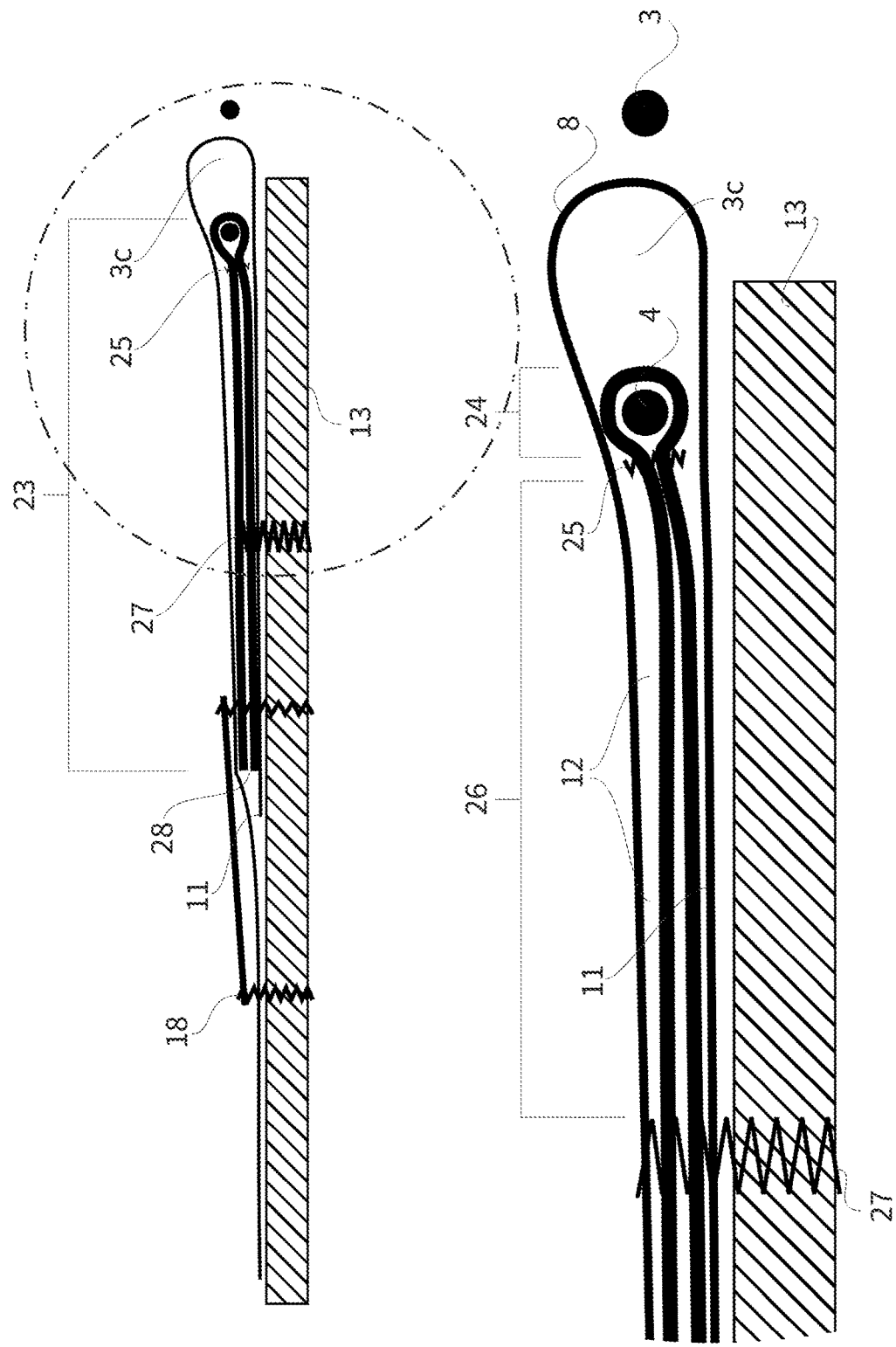
FIG. 4 shows the B-B cross-section of the chest strap part holding a moving frame and the main parts thereof, with an enlarged view of the length of the channel portion and the primarily stretching portion in an embodiment where the elastic element fixing zone is not the same as the back strap fixing zone, but is shifted from the back strap fixing zone in the direction of the moving frame.
Figure 5:
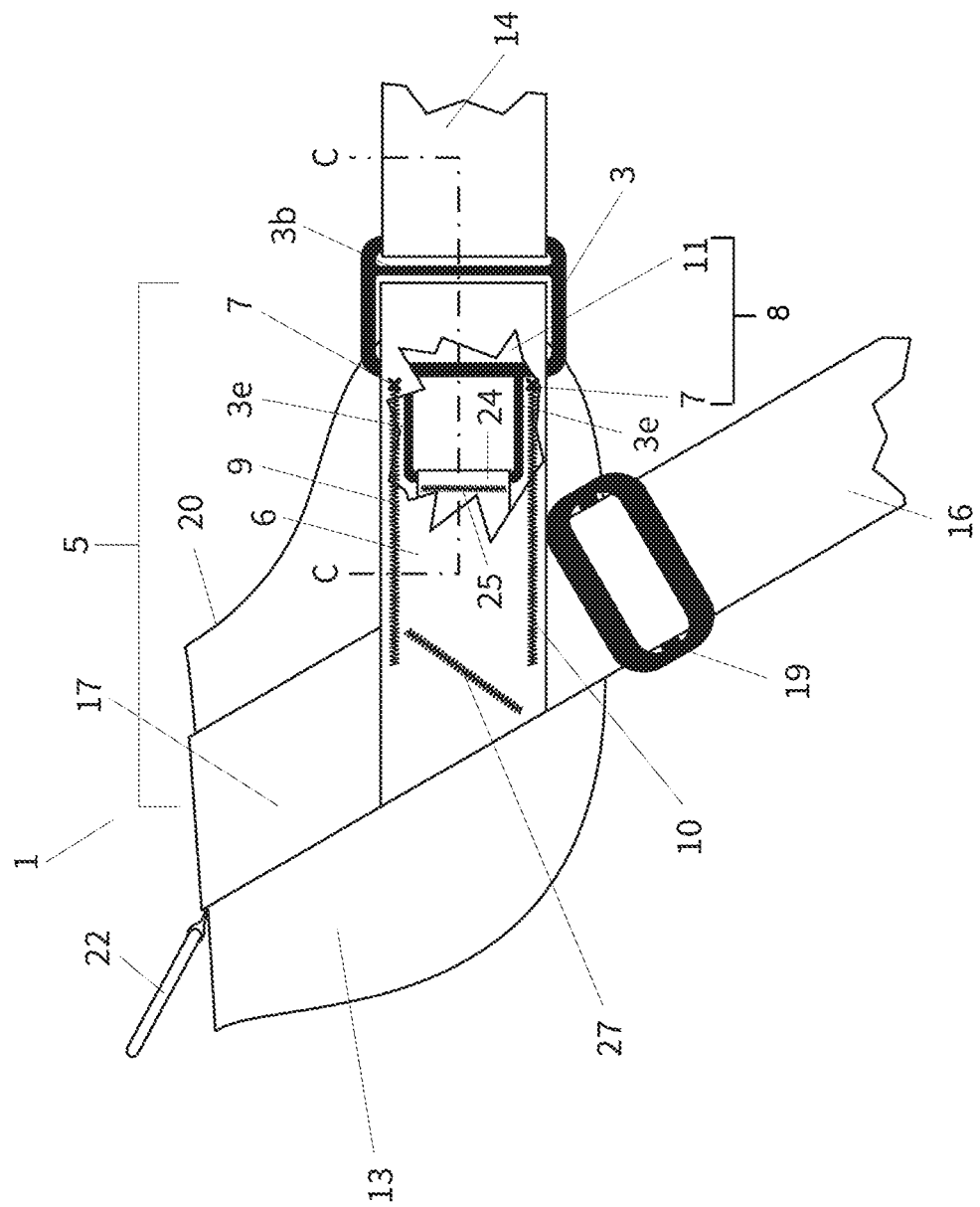
FIG. 5 shows a local cross section of the channel covering chest strap portion on a side view of the dog harness, showing the moving frame with three through openings separated from one another in such a way that the moving frame has an opening for the chest strap part crossing the chest bone, and a limiting element opening separated from it by a dividing element, as well as a loop portion opening.

The stretch limiting element is 8 an extension of the channel covering chest strap portion 6 shown in FIGS. 3, 4 and 5, in the continuation thereof, extending beyond the held portion 4 of the moving frame 3. In this embodiment, the stretch limiting element 8 is folded back on itself in the direction of the back strap 17 and, starting from the starting points 7, it is formed in the continuation of the channel covering chest strap portion 6, ending in the underlay 11, closed by the starting points 7.

The moving frame 3 is most preferably rectangular, with rounded corners. Preferably, it is made of stainless steel.

FIG. 3 shows the A-A cross section of the elastic dog harness of FIG. 2, showing the primarily stretching portion 26 of the elastic element 23 shown in a local cross section in FIG. 2, which comprises at least two layers resting, folded on each other. The primarily stretching portion 26 is formed in a channel portion 12 formed by the channel covering chest strap portion 6 and the underlay 11. The channel covering chest strap portion 6 and the underlay 11 are fixed to each other along one edge of the primarily stretching portion 26, in a manner not touching it, by the fixing zone towards the leash ring 9, while along the other edge, in a manner not touching it, by the fixing zone towards the belly strap 10, defining the width of the channel portion 12. The width of the channel portion 12 is at least 5% wider than the width of the primarily stretching portion 26.

The underlay 11 is fixed together with the stiffener 13 in a fixed manner, whereby the channel portion 12 will not get wrinkled by the elastic deformation of the primarily stretching portion 26 during normal use.

FIG. 4 shows the B-B cross section of the elastic dog harness 1 of FIG. 2, showing the cut edge 28 of the elastic element 23 led under the back strap 17, as shown in FIG. 2, and the primarily stretching portion 26 formed between the elastic element fixing zone 27 and the loop portion fixing 25, as well as the moving loop portion 24 tightly surrounding the held portion 4 of the moving frame 3. The length of the primarily stretching portion 26 extending into the channel portion 12 in the direction of the back strap 17 is at least three times that of the moving loop portion 24 measured in the same direction, but preferably it is a minimum of five times that length. The elastic element fixing zone 27 is sewing fixing together the channel covering chest strap portion 6, the underlay 11, and the elastic element 23 located between them. The primarily stretching portion 26 is a rubber strap folded back on itself around the held portion 4 in the direction of the back strap 17, thereby extending to the elastic element fixing zone 27 in two layers. The thickness of the primarily stretching portion 26 is two times the thickness of the moving loop portion 24 surrounding the held portion 4. The loop portion fixing 25 fixes the moving loop portion 24 tightly on the held portion 4, without passing through either the underlay 11 or the channel covering chest strap portion 6. The loop portion fixing 25, together with the moving loop portion 24, moves along the whole length of the stretch limiting element 8.

The loop portion fixing 25 allows the primarily stretching portion 26 to move freely between the channel covering chest strap portion 6 and the underlay 11, and prevents the held portion 4 from turning out from the moving loop portion 24. The moving loop portion 24 is fixed by the loop portion fixing 25 with pre-tensioning. Under load, stretching occurs first over the primarily stretching portion 26, making it possible to size elasticity in the channel portion 12 according to the weight of the dog.

Figure 6:
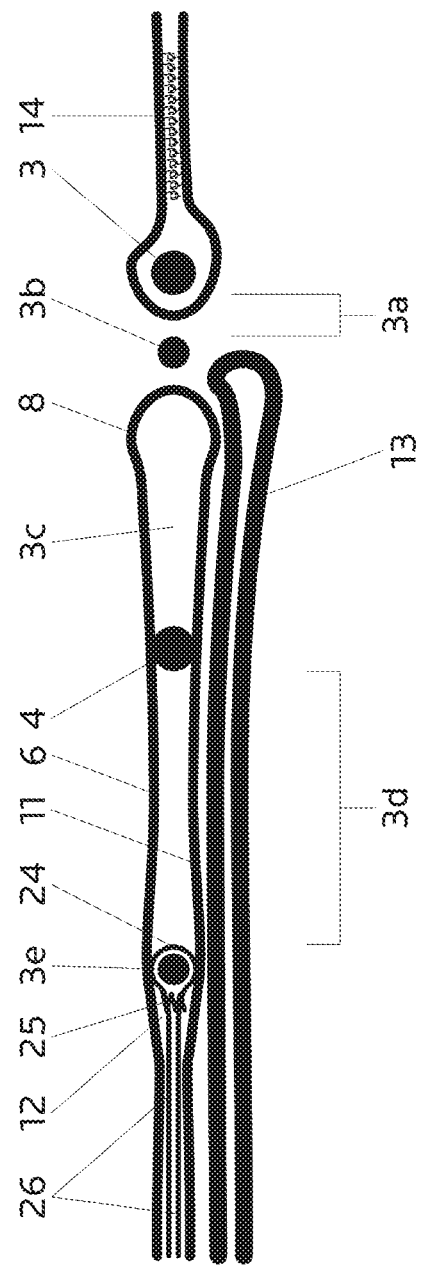
FIG. 6 shows the C-C cross-section of the parts of the moving frame and the elements connected thereto.

FIG. 5 shows a preferred embodiment of the moving frame 3, where the chest strap part holding a moving frame 5 is led through a limiting element opening 3c filled by the stretch limiting element 8 in a loop-like manner up to the dividing element 3b. The dividing element 3b is connected to the moving frame 3 at an angle of 90 degrees, and separates from each other the limiting element opening 3c and an opening for the chest strap part crossing the chest bone 3a. In the case of dogs weighing 20-40 kg, the length of the limiting element opening 3c is most preferably 20 mm, measured in the line of the chest strap part holding a moving frame 5 and the chest strap part crossing the chest bone 14, while that of the opening for the chest strap part crossing the chest bone 3a is less than 10 mm, measured in the same direction. The local cross section of the channel covering chest strap portion 6 shows that the moving loop portion 24 of the elastic element 23 is led through a loop portion opening 3d, tightly surrounding a loop portion frame 3e. The loop portion fixing 25 is implemented with pre-tensioning. The loop portion opening 3d of the moving frame 3 extends into the channel portion 12 in the direction of the back strap 17. In a preferred embodiment the loop portion frame 3e extends into the channel portion 12 at least to an extent equal to the distance between the held portion 4 as shown in FIG. 6 and the dividing element 3b. The length of the loop portion opening 3d measured in the direction of the back strap 17 is at least equal to the distance between the held portion 4 and the dividing element 3b. The stretch limiting element 8 starts from the starting points 7, extending in the direction of the dividing element 3b. The starting points 7 are located on the sides of the held portion 4 of the moving frame 3 towards the fixing zone towards the leash ring 9 and towards the fixing zone towards the belly strap 10, in the direction of the back strap 17. The fixing zone towards the leash ring 9 and the fixing zone towards the belly strap 10, as well as the starting points 7, pass through the channel covering chest strap portion 6 and the underlay 11. The loop portion fixing 25 does not extend beyond the moving loop portion 24; it is limited by the width thereof measured in the direction of the fixing zone towards the leash ring 9 and the fixing zone towards the belly strap 10. The loop portion frame 3e is enclosed by the fixing zone towards the leash ring 9 and the fixing zone towards the belly strap 10, as well as the starting points 7. The back strap 17 of the elastic dog harness 1, equipped with a leash ring located on the axis line 22, ends in the chest strap parts holding a moving frame 5.

The back strap 17 is crossed by the fixing zone towards the belly strap 10 and the fixing zone towards the leash ring 9. The belly strap 16, equipped with a buckle portion 19 like the opposite end of back strap 17, starts from the chest strap parts holding a moving frame 5.

FIG. 6 shows the C-C cross-section of FIG. 5, showing the primarily stretching portion 26 formed in the channel portion 12, and in the continuation thereof, in the direction of the moving frame 3, the loop portion fixing 25 and the moving loop portion 24 tightly surrounding the loop portion frame 3e. The whole length of the loop portion opening 3d is covered by the channel covering chest strap portion 6 and the underlay 11. The length of the loop portion opening 3d is at least equal to the distance between the held portion 4 and the dividing element 3b. The stretch limiting element 8 is a bulging part formed from an extension of the channel covering chest strap portion 6 and the underlay 11, filling at least 70% of the limiting element opening 3c in the direction of the dividing element 3b. The opening for the chest strap part crossing the chest bone 3a is formed between the dividing element 3b and the moving frame 3 surrounded by the chest strap part crossing the chest bone 14. The length of the opening for the chest strap part crossing the chest bone 3a is a maximum 25% of the length of the limiting element opening 3c. Based on mechanical tests, the length of the limiting element opening 3c is 15-30 mm. The stretch limiting element 8 preferably allows the elastic element 23 to stretch by 13-25 mm, making easier the movement of the shoulder joints of the dog and reducing the adverse effects of tuggings.

Figure 7:
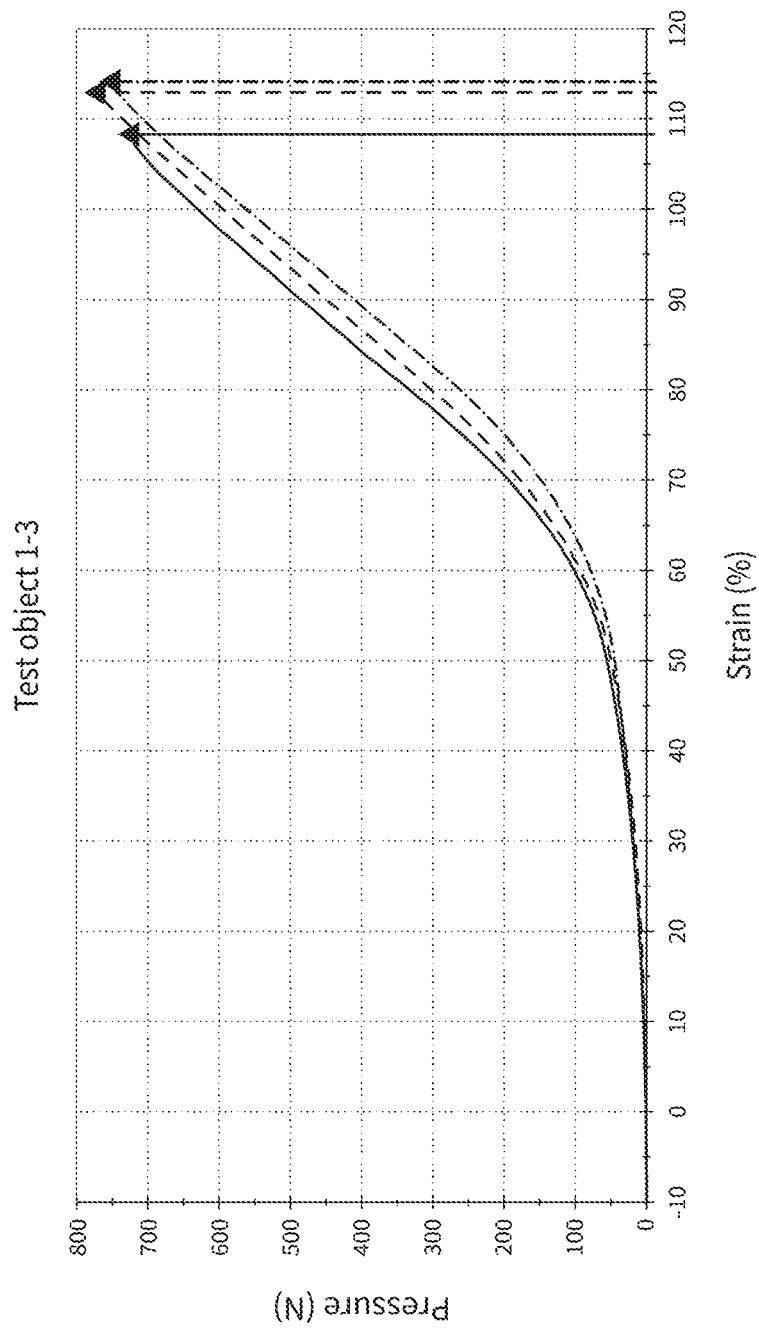
FIG. 7 shows the results of the physical testing of the elastic element on a graph.

FIG. 7 shows tensile testing results for three elastic elements 23 of FIG. 4, preferably in a width of 25 mm, to be incorporated into dog harnesses for dogs weighing 20-40 kg. It can be stated that, with the stretching of the elastic element 23 by 50%, the stretching of the pre-tensioned elastomer warp yarns in the fabric gives a low linear increase in force. It can be seen from the diagram that the elastic element 23 can be safely stretched by 40%, for which, if the stretching is limited to 20 mm, a strap length of a minimum of 50 mm should be selected.

The test was carried out in such a way that, after reaching the stretch limiting element 8, at a 2.5-fold strength the testing was stopped, then the stretching cycle was repeated several times. When the limit of the stretching of the incorporated elastic element 23 is reached, the strap of high tensile strength comes into action and the force increases suddenly.

Elastic springs are characterized by the fact that, as a result of repeated stress, the force-stretching diagram declines. For the efficient, prolonged operation of elastic springs, the length of the elastic element 23 is selected to be between 60-100 mm, if possible, fixed with slight pre-tensioning at the sewing. The spring stiffness of the elastic element 23 should be adjusted to the weight of the dog; for smaller dogs, softer springs should be used.

The incorporation of the primarily stretching portion into the chest strap of the elastic dog harness so that it extends in a channel portion makes possible a long service life. Due to the stretch limiting element, the elastic element becomes capable of tolerating the acting forces without deformation in the long-term. The channel portion allowing the elastic element to stretch freely makes possible the planned increase in the length of the primarily stretching portion, the prevention of overloading, and prolonged operation without deformation. The channel portion and the stretch limiting element provides complete protection against external influences, such as the UV rays of the sun, getting caught up during use, getting damaged by other landmarks, and direct friction with the body of the dog.

The loop portion fixing, together with the primarily stretching portion, moves freely in the channel portion, between the channel covering chest strap portion and the underlay. The at least two, but more preferably three, openings of the moving frame provide separate means for fixing and/or connecting the chest strap part crossing the chest bone, the stretch limiting element of the chest strap part holding a moving frame, and the elastic element. In the long term, the sized primarily stretching portion of the chest strap of the elastic dog harness, moving in the covered channel portion, capable of limited stretching over a given section, makes possible a significant reduction in the load acting on the chest and shoulder joints of the dog, and on the hand holding the leash when leading the dog.

LIST OF REFERENCE NUMBERS 1) elastic dog harness
2) chest strap
3) moving frame
3a) opening for the chest strap part crossing the chest bone
3b) dividing element
3c) limiting element opening
3d) loop portion opening
3e) loop portion frame
4) held portion
5) chest strap part holding a moving frame
6) channel covering chest strap portion
7) starting point
8) stretch limiting element
9) fixing zone towards the leash ring
10) fixing zone towards the belly strap
11) underlay
12) channel portion
13) stiffener
14) chest strap part crossing the chest bone
15) chest strap hook-and-loop fastener
16) belly strap
17) back strap
18) back strap fixing zone
19) buckle portion
20) connecting element
21) axis line
22) leash ring located on the axis line
23) elastic element
24) moving loop portion
25) loop portion fixing
26) primarily stretching portion
27) elastic element fixing zone
28) cut edge

The invention claimed is:

1. An elastic dog harness comprising:
at least one vertical back strap crossing an axis line;
at least one leash ring located on the axis line fixed thereon in a manner touching the axis line;
at least one belly strap surrounding the chest of a dog vertically on a side opposite to the back strap;
a chest strap part holding a moving frame on both sides of the axis line, lined with an underlay, extending between at least the back strap and a moving frame, surrounding a held portion of the moving frame, while there is a chest strap part crossing a chest bone, threaded through the moving frame on a side opposite to the held portion, interrupting the continuity of the chest strap, folded back on itself in the direction opposite to the chest strap part holding a moving frame;
the chest strap part crossing the chest bone and the chest strap parts hold a moving frame together to form a chest strap surrounding at least one of, the neck and chest of the dog;
the chest strap part holding a moving frame of the elastic dog harness having at least one elastic element on both sides of the axis line, stretching at least partially, the maximum stretching being determined by a stretch limiting element, which is an extension of the chest strap part holding the moving frame, threaded through the moving frame as a loose loop extending beyond the held portion thereof, forming a loop traversable from the direction of the back strap and a connecting element;
the elastic element being at least partially covered by the stretch limiting element from the direction of the chest strap part crossing the chest bone, loosely surrounding the elastic element, which elastic element is threaded through the moving frame,
wherein the elastic dog harness comprises a chest strap part holding the moving frame on both sides of the axis line, comprising at least one channel covering chest strap portion at least partially covering the elastic element, extending beyond the elastic element in the direction of both the back strap and the belly strap, as well as starting points;

the stretch limiting element having a channel portion open towards the chest strap part crossing the chest bone, covered by the held portion of the moving frame in a releasable manner, extending from the starting points in the direction of the back strap, of a length between the starting points and an elastic element fixing zone, enclosed by the channel covering chest strap portion and the underlay, and the maximum width of the channel portion is limited by a fixing zone towards the leash ring and a fixing zone towards the belly strap, running between the back strap and the starting points, fixing together the channel covering chest strap portion and the underlay, and the primarily stretching portion of the elastic element moves in the channel portion in the direction of the chest strap part crossing the chest bone and in the opposite direction up to a length determined by the stretch limiting element, furthermore, the primarily stretching portion of the elastic element is at least partially separated from a moving loop portion by a loop portion fixing moving together with it in the channel portion the stretch limiting element is threaded through the moving frame through a limiting element opening, while the chest strap part crossing the chest bone is threaded through an opening for the chest strap part crossing the chest bone, and being separated from the limiting element opening by a dividing element.

2. The elastic dog harness according to claim 1, wherein the moving loop portion is threaded through a loop portion opening at least partially separated from the limiting element opening by the held portion.

3. The elastic dog harness (1) according to claim 1, wherein a loop portion frame is connected to the held portion in the continuation thereof.

4. The elastic dog harness according to claim 1, wherein the loop portion frame extends into the channel portion, enclosed on two sides by the starting points.

5. The elastic dog harness according to claim 1, wherein the length of the loop portion frame measured in the direction of the back strap is equal to or longer than the length of the limiting element opening measured in the same direction.

6. The elastic dog harness according to claim 1, wherein the loop portion frame is enclosed tightly by the starting points on the side of the fixing zone towards the leash ring and on the side of the fixing zone towards the belly strap.

7. The elastic dog harness according to claim 1, wherein the length of the primarily stretching portion measured between the loop portion fixing and the elastic element fixing zone is equal to or longer than the width of the primarily stretching portion measured in the direction of the loop portion fixing.

8. The elastic dog harness according to claim 1, wherein the moving loop portion is formed from the primarily stretching portion, an elastic strap, in the continuation thereof.

9. The elastic dog harness according to claim 1, wherein the loop portion fixing fixes the moving loop portion tightly on the moving frame.

10. The elastic dog harness according to claim 1, wherein the starting points are preferably sewings or rivet reinforcements, enclosing the loop portion frame of the moving frame on the side of the fixing zone towards the leash ring and on the side of the fixing zone towards the belly strap.

11. The elastic dog harness according to claim 1, wherein the width of the primarily stretching portion measured in the direction of the loop portion fixing is maximum 90% of the width of the chest strap part holding a moving frame in the same direction.

12. The elastic dog harness according to claim 1, wherein the distance of the fixing zone towards the leash ring and the fixing zone towards the belly strap from each other is at least 10% longer than the width of the primarily stretching portion measured in the same direction.

13. The elastic dog harness according to claim 1, wherein at least one cut edge of the elastic element is led under the back strap.

14. The elastic dog harness according to claim 1, wherein the elastic element fixing zone is sewing.

15. The elastic dog harness according to claim 1, wherein, in a preferred embodiment of the elastic element fixing zone, the primarily stretching portion is shorter on the side of the fixing zone towards the leash ring than on the side of the fixing zone towards the belly strap.

16. The elastic dog harness according to claim 1, wherein the moving loop portion is fixed by the loop portion fixing with pretensioning.

17. The elastic dog harness according to claim 1, wherein the primarily stretching portion reaches the maximum stretching controlled by the stretch limiting element at a load of 10-25 N (Newton).

18. The elastic dog harness according to claim 1, wherein the maximum stretching of the primarily stretching portion allowed by the stretch limiting element is 30%.

19. The elastic dog harness according to claim 2, wherein a loop portion frame is connected to the held portion in the continuation thereof.

20. The elastic dog harness according to claim 2, wherein the loop portion frame extends into the channel portion, enclosed on two sides by the starting points.

* * * * *